United States Patent
Derek

(10) Patent No.: US 9,258,299 B2
(45) Date of Patent: Feb. 9, 2016

(54) BIOMETRIC CLOUD COMMUNICATION AND DATA MOVEMENT

(75) Inventor: Reynolds J. Derek, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/002,329

(22) PCT Filed: Dec. 29, 2011

(86) PCT No.: PCT/US2011/067833
§ 371 (c)(1),
(2), (4) Date: Aug. 29, 2013

(87) PCT Pub. No.: WO2013/101056
PCT Pub. Date: Jul. 4, 2013

(65) Prior Publication Data
US 2013/0333015 A1    Dec. 12, 2013

(51) Int. Cl.
| H04L 29/06 | (2006.01) |
| G06F 21/32 | (2013.01) |
| G06F 21/60 | (2013.01) |
| H04W 12/06 | (2009.01) |
| H04L 29/08 | (2006.01) |

(52) U.S. Cl.
CPC .......... *H04L 63/0861* (2013.01); *G06F 21/32* (2013.01); *G06F 21/606* (2013.01); *H04W 12/06* (2013.01); *G06F 2221/2115* (2013.01); *H04L 67/06* (2013.01)

(58) Field of Classification Search
None
See application file for complete search history.

(56) References Cited

U.S. PATENT DOCUMENTS

| 2004/0073803 | A1* | 4/2004 | Keramane ................... 713/186 |
| 2005/0246763 | A1  | 11/2005 | Corcoran et al. |
| 2008/0091613 | A1  | 4/2008 | Gates et al. |
| 2010/0299313 | A1  | 11/2010 | Orsini et al. |

FOREIGN PATENT DOCUMENTS

WO    2013/101056 A1    7/2013

OTHER PUBLICATIONS

International Search Report and Written Opinion received for PCT Patent Application No. PCT/US2011/067833, mailed on Sep. 10, 2012, 9 pages.
International Preliminary Report on Patentability received for PCT Patent Application No. PCT/US2011/067833, mailed on Jul. 10, 2014, 6 pages.

* cited by examiner

*Primary Examiner* — Ghazal Shehni
(74) *Attorney, Agent, or Firm* — Derek J. Reynolds

(57) ABSTRACT

An apparatus, method, system, and computer accessible medium are disclosed. In one embodiment the apparatus includes a first computing device having a processor coupled to memory. The apparatus also includes a first biometric reader unit to determine biometric signatures, the biometric reader unit communicatively coupled to the computing device. The memory stores a plurality of data files. The apparatus also includes a bio-packet generation unit to generate a packet comprising a first bio-identifier, the first bio-identifier comprising at least one biometric signature of a user. Finally, the apparatus includes a bio-packet transmission unit to send the generated packet to a remote server.

16 Claims, 8 Drawing Sheets

BIOMETRIC CLOUD COMMUNICATION AND DATA MOVEMENT

DESCRIPTION OF THE RELATED ART

The invention relates to the implementing the movement of data between devices connected to a cloud computing environment through the use of bio-metric signatures.

DESCRIPTION OF THE RELATED ART

Cloud computing has become popular throughout the computing spectrum. It allows for computing to be delivered as a service. Specifically, storage, software applications, and data transfers can be accomplished through remote access of information across a host of devices coupled to a centralized networking backbone, such as the Internet. One example might be an individual who owns a variety of computing devices and desires to have unfettered access to data among these devices. Cloud computing can facilitate simple data movement among these without requiring direct device-to-device copying and pasting of data. In recent years the digital music industry has been enhanced with cloud advances. A person might have a home computer, a work computer, an MP3 player, a set-top console device attached to a television at home, and a smartphone, where each device has the capability to replay MP3 files (or music files of other formats). If each of the listed devices has access to a cloud computing storage arrangement, then the cloud may include all of the person's purchased music files and each device connecting to the cloud can download some of the music files on the cloud, temporarily or permanently. But, with the cloud available, each device does not need to copy music files from other devices, rather every device can copy music files from the cloud, where the cloud has the common master set of music files. This arrangement also is helpful for any number of other types of stored data such as video files, document files, picture files, among others. Generally speaking, a set of cloud connected devices is more efficient at storing and transferring these files that non-cloud devices.

BRIEF DESCRIPTION OF THE DRAWINGS

The following description and accompanying drawings are used to illustrate embodiments of the invention. In the drawings.

DETAILED DESCRIPTION

Security has become a large cloud computing issue. This is at least partially because of the ease of file access among a user's computing devices connected to the cloud. Many times a user identifies themselves as logging into their cloud account with a username and password and once access is granted, free use of any file stored in the cloud is available. For example, if a user introduces a new device to their list of cloud-connected devices, the cloud security would generally ask for the username and password to gain access. This might allow a cloud copy to another person's device, as long as the initial username and password were input. There are problems related to this type of scenario, such as when a user logs in to the cloud on a new device, the device may remember the username and password, even if the user does not want this to happen. The cloud computing system may not allow an additional device to be authorized through a username and password setup if the cloud service has a draconian registered device limitation (e.g., only devices registered to the original user may be allowed to connect to the cloud service related to the user). Many other limitations become obvious with standard cloud connectivity among devices.

Figure 1:
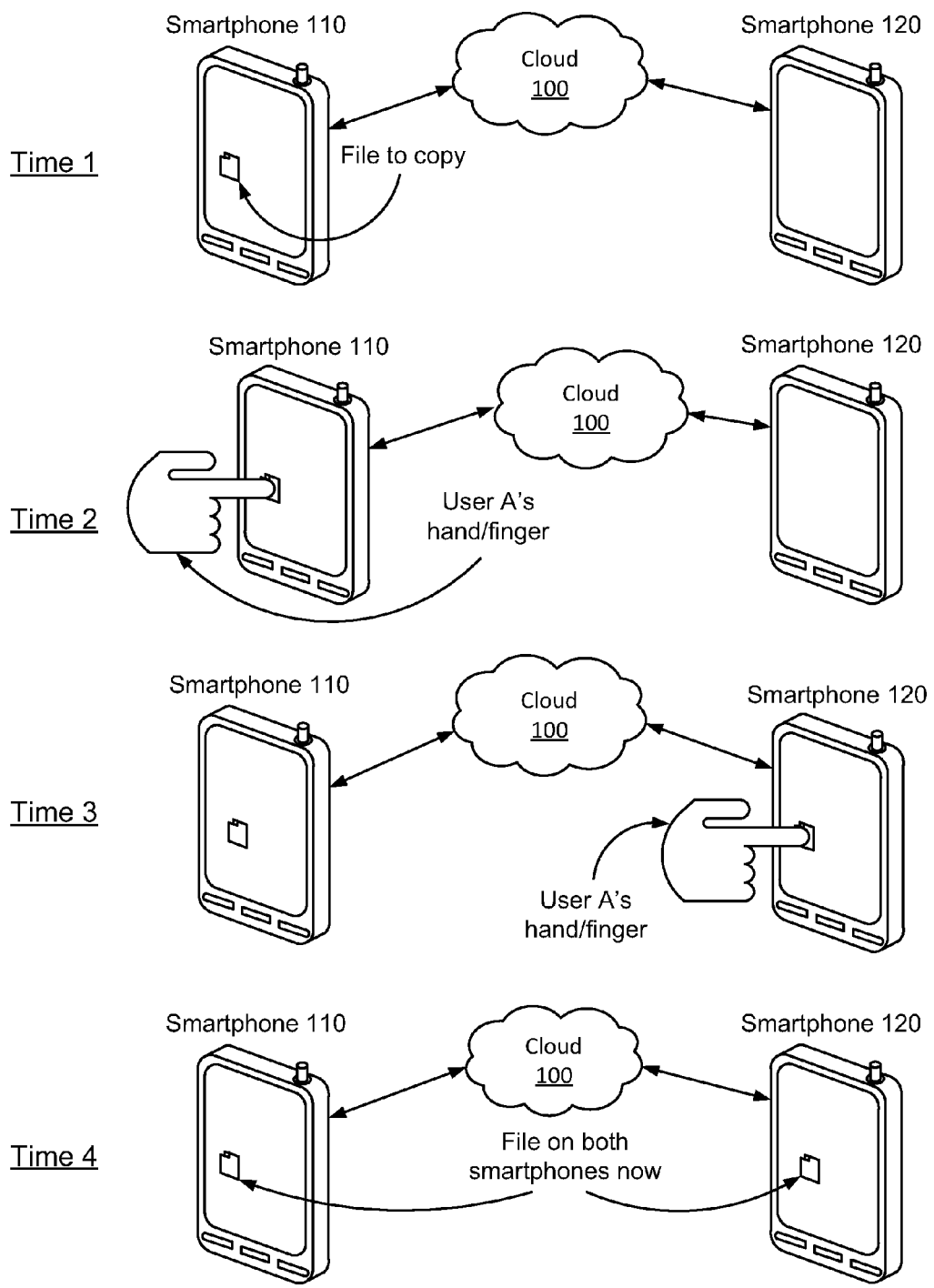
FIG. 1 describes an embodiment of a method of moving a file between two smartphones using a biometric signature associated with the file.

To remedy many of these situations, embodiments of a method, device, and system are disclosed that implement cloud communication and data movement among a myriad of devices through bio-metric signature techniques are disclosed. To illustrate an example, FIG. 1 describes an embodiment of a method of moving a file between two smartphones using a biometric signature associated with the file. In FIG. 1, two smartphones, smartphone 110 and smartphone 120, are communicatively coupled to the cloud 100. Throughout the description there are references to smartphones as example devices where data is moved to and from. These are purely examples. In many other embodiments, the implemented devices are tablets, laptop computers, desktop computers, server computers, console set-top box computers, embedded computers (e.g., within automobiles), among other forms of computer systems.

Although the term "cloud" has many connotations, according to many embodiments described herein, the term cloud comprises a set of network services that are capable of being utilized remotely over a network. For example, the cloud can be a service provider that checks network transaction requests for signatures of users (i.e., whether a user requesting to have a cloud transaction performed is a known user with previously determined signatures). Another example might be a general transaction protocol naming convention where a transaction from a unique and unknown user is saved into a general internetwork backbone buffer, given a unique transaction ID, and stored for a determinate amount of time to wait for a second cloud transaction ID'ing the first transaction with the transaction ID for completion. Yet another example might be a cloud transaction type being linked to a specific cloud transaction processing server, uploaded to the server with no prior knowledge of the user initiating the transaction, where the cloud transaction processing server then waits a determinate amount of time for a second cloud transaction related to the first cloud transaction stored on the cloud processing server to complete the cloud transaction.

Additionally, in many embodiments, although the cloud may refer to computing environment services for software applications time-based usage, generally in embodiments described herein the cloud is referring to data transaction cloud services (i.e., data movement, data copying, data mirroring, etc.) for one or more computing devices.

Returning to the illustrative example in FIG. 1, at a time 1 a user determines that he/she would like to copy a file from smartphone 110 to smartphone 120. After this determination is made, at time 2, the user places his/her finger on the smartphone 110 screen over the file to be transferred to smartphone 120. This file may be represented with an icon, an amount of text, a thumbnail image, or in another way. Smartphone 110 accomplishes two things when the user has placed his/her finger on the file on the screen.

In this embodiment, both smartphones 110 and 120 include fingerprint scanning capabilities. Thus, when the user places his/her finger on the screen of smartphone 110, the phone makes a digital copy of the fingerprint. Since fingerprints are unique to each person, the digital copy will be a unique biometric identification value (bio-identifier) that includes a statistical representation of the unique fingerprint. The user's fingerprint is unique to the user and incapable of being reproduced with anything other than the user's same fingerprint.

In other embodiments, there may be other ways of recording a user's fingerprint, such as having a camera take a picture of the person's fingerprint, a smartphone having a special fingerprint sensor on the back of the phone, a secondary device such as a camera or a fingerprint scanner coupled to the smartphone through a micro-Universal Serial Bus (USB) or other connection socket, among other methods. With a standard capacitive touchscreen, there may be an added charged coupled device (CCD) sensor behind at least a portion of the capacitive screen. In these embodiments, not only can the screen track touch based on capacitance, but can also create images of objects placed on the surface, such as the fingerprint from a finger.

Still at time 2, when the bio-identifier has been created and the data (i.e. file) to be transferred has been determined, smartphone 110 creates a bio-packet that includes a header with the bio-identifier and a data section with the file and transfers the bio-packet into the cloud. The implementation specifics of the hardware utilized in the cloud is discussed further below, but generally the cloud has functionality to at least temporarily store the bio-packet for the user.

Then, at time 3, the user is now located at the second smartphone, smartphone 120, and places his/her finger on the smartphone 120 touch screen. Smartphone 120 determines that the user wants to accomplish something and prompts the user whether he/she wants to paste a file from the cloud. When the user acknowledges that cloud pasting is desired, smartphone 120 then makes another digital copy of the user's fingerprint and creates the unique bio-identifier associated with the same fingerprint. Smartphone 120 then inquires with the cloud whether there is data stored in the cloud that is associated with the user's unique bio-identifier. The cloud then responds to Smartphone 120 that there is data and transfers the data to smartphone 120.

Finally at time 4, after the data transfer to smartphone 120, the file is now located on both smartphone 110 and B. The transfer was accomplished solely through the cloud 100 and the user was able to complete this transfer solely through the use of his/her biometric signature that was capable being utilized to identify the data while it was being temporarily stored in the cloud and also capable of verifying the user's identity on the second device. Thus, a basic version of a biometrically secure data cloud transfer is shown.

Figure 2:
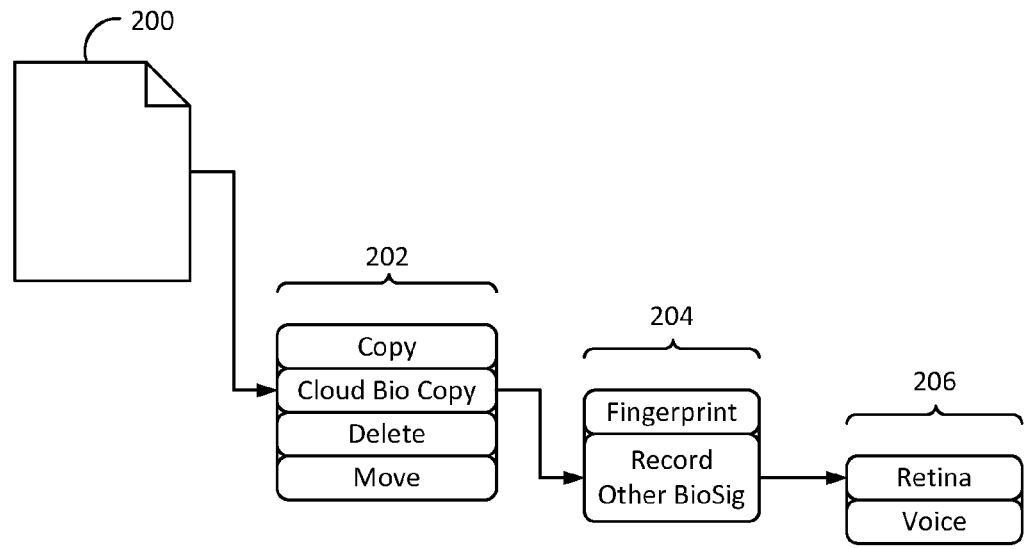
FIG. 2 illustrates an embodiment of menu selections for the manipulation of a file on a smartphone.

Turning now to more detailed implementations of how the cloud transfer is accomplished, FIG. 2 illustrates an embodiment of menu selections for the cloud copy of a file on a smartphone. In many embodiments, the user will place his/her finger specifically over the graphical representation of the file that the user wants to manipulate. For example, the user may place his/her finger on top of an icon 200 representing an image file. When the user leaves his/her finger in the same location on the screen for a period of time, smartphone 110 may determine that the user is attempting to manipulate the file in some way. When this has been determined, smartphone 110 may pull up a first level menu 202 that gives the user a number of options for the manipulation of the file. The prompt may include a number of options such as Copy, Cloud Bio Copy, Delete, Move, etc. Thus, the user may select from any of the options present to tell smartphone 110 how to proceed with manipulation of the file. Although other options may be present, in this example, the user decides to select Cloud Bio Copy.

By selecting Cloud Bio Copy, a second menu may pop up that determines what type of uniquely identifiable biometric signature will be selected to be associated with the copied file when transferred through the cloud network. In many embodiments, there are at least biometric signatures that utilize a user's fingerprint(s), a user's voice, as well as a map of a user's retina. Obviously there would need to be mechanisms capable of scanning each of these biometric signatures in order for a given signature to be applicable.

In FIG. 2, because in dealing with smartphones it is plausible that a user's fingerprint was already scanned when first initiating the Cloud Bio Copy, the smartphone may prompt the user whether to use that fingerprint or to record a secondary biometric signature to associate with the file in menu 204. In many embodiments, a secondary biometric signature is desired because the second device that the data is being copied to (the destination device) may not have the same biometric signature scanning mechanisms that the first device that the data is originating from (the origination device) has available. Thus, if a user is copying a file from a smartphone to a desktop computer and the smartphone has fingerprint and voice scanning mechanisms, but the desktop only has a voice scanning mechanism, then the unique bio-identifier in the cloud would need to have a voice map biometric signature in order to be able to match the voice map recorded on the desktop computer. Therefore, an additional sub-menu 206 may be utilized to add an additional biometric signature or use an alternate biometric signature (e.g., retina, voice).

In many embodiments, the origination device, to allow more flexibility or to greatly increase security, may scan multiple biometric signatures that are all attached to the same file being transferred to the cloud. Thus, after an initial scan of a first biometric signature to be utilized, the user may be prompted whether he/she wants to scan a second/third/etc. biometric signature to be added to the header of the bio-packet sent to the cloud. According to some embodiments, this may allow the user to then transfer the file to a second device that only can scan fingerprints and a third device that only can scan a voice recognition map of the user's voice. In other embodiments, the user wants added protection and with both voice and fingerprint biometric signatures may require that a second device receiving the file will be required to verify both biometric signatures prior to receiving the file.

Figure 3:
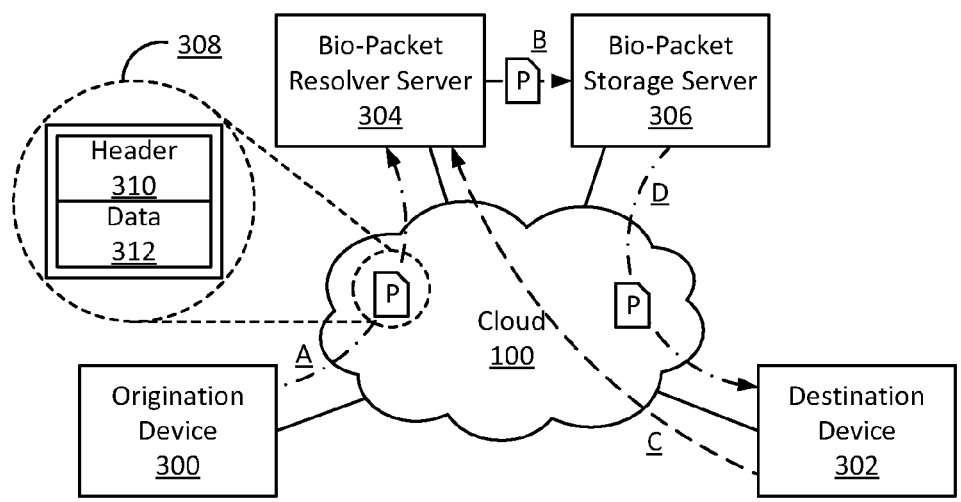
FIG. 3 illustrates an embodiment of the entire cloud data transfer system utilizing biometric signatures.

FIG. 3 illustrates an embodiment of the entire cloud data transfer system utilizing biometric signatures. The cloud 100 couples several devices to create the complete system. According to many embodiments, there is an origination device 300, a destination device 302, a bio-packet resolver server 304, and a bio-packet storage server 306. In other embodiments that will be discussed later in this document, the bio-packet resolver server 304 and bio-packet storage server are combined into one server.

The origination device 300 may be any type of computing device/computer system that is capable of receiving user input. In some embodiments, origination device 300 may be a conglomeration of several devices, the combination of which is capable of receiving user input. The user input at least comprises biometric signature scan input information. Though, in many embodiments, the origination device 300 also allows many other types of input. For example, if the data to be transferred between devices communicatively coupled to the cloud comprises an image, then in many embodiments, the origination device will additionally have a camera to create the image files by taking a photograph. In other embodiments, the file to be transferred is a text-based file and an input device such as a keyboard, coupled to origination device 300, may be present (though not shown in the figure) to create the text file. In yet other embodiments, origination device 300 is a data repository, which receives data from wired and wireless networking and wired cabling interfaces and stores the data locally for use by one or more other devices.

In any event, a user interacting with origination device 300 requests a data transfer to take place over the cloud 100 network and eventually arriving at destination device 302. According to many embodiments, the information required from the user to initiate the request does not require any information related to the destination device. The request specifically is a cloud biometrically enhanced copy request (i.e., cloud bio copy). The request is sent out to the cloud 100. In many embodiments, a bio-packet resolver server 304 is communicatively coupled to the cloud. In many embodiments, the bio-packet resolver server 304 may be a top level address recognition server for the cloud, thus, similar to Internet Protocol methodology, a high level address for a given biometric packet is sent out to the cloud and routed to a centralized bio-packet resolver server 304 or group of interconnected centralized bio-packet resolver servers. In other words, when a bio-packet is generated by any device attached to the cloud, the packet is sent up to the cloud with a first order address that initially routes any bio-packet-related data packet to the bio-packet resolver server 304 or servers (communication route A in FIG. 3).

Figure 4:
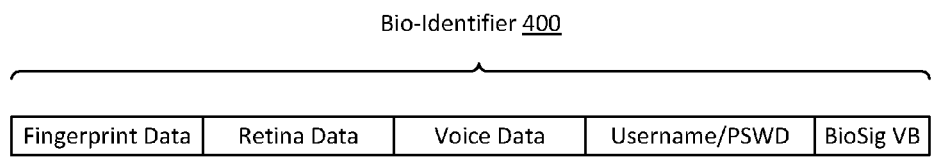
FIG. 4 illustrates an embodiment of the unique bio-identifier.

Once the bio-packet resolver server 304 receives the bio-packet (shown in greater detail in call-out 308 as bio-packet header 310 and bio-packet data 312), the resolver server performs a lookup using the unique bio-identifier in the header 310. FIG. 4 illustrates an embodiment of the unique bio-identifier. In the embodiment shown in FIG. 4, the unique bio-identifier 400 includes fingerprint data, retina data, voice data, and username and password data. In many other embodiments, there are additional biometric signatures, comprising sections of data in the unique bio-identifier 400. Also, certain bio-identifiers shown may not be implemented, in which case either the basic identifier itself does not include that section, or the basic identifier simply leaves that section blank or null.

In many embodiments, a unique numerical value signifying a compilation of a given biometric signature is stored in a particular section of the unique bio-identifier 400. For example, a numerical value signifying the audio data captured for a 10-second clip of a person's voice saying a certain passphrase may be what is stored in the voice data (e.g., pauses, pitch, locution, tremors, etc. may all lead to determine the specific person the voice originates from).

For fingerprint and retina data, a certain set of data points is stored that compares a fingerprint map or a retina map to all other known fingerprints and retinas, which creates the unique signature. The term "map" in this sense refers quite literally to a location-based map of certain elements that are generally found in each fingerprint or each retina, their proximity to each other, their relative thicknesses, shapes, curvatures, etc. All of this data may be also compiled into a significant numerical value that, when decoded by a fingerprint recognition or retina recognition software, hardware, or firmware, can uniquely identify a person's retina or fingerprint differently from any other person.

Thus, in many embodiments, when a unique bio-identifier segment is filled with a biometric signature, the portion of the unique bio-identifier storing that information is full of detailed data. On the other hand, if a given form of biometric signature is not available, that portion of the unique bio-identifier may be zeroed out. Additionally, in some embodiments, as a backup plan, the unique bio-identifier might also store a segment that has a username and password to identify the person in case no other form of biometric signature exists on the destination device.

In other embodiments, the unique bio-identifier 400 also includes a small set of biometric signature valid bits (BioSig VB) values that can quickly allow the bio-packet resolver server 304 to perform a lookup of the valid biometric signatures in the unique bio-identifier. For example, in the case of a unique bio-identifier 400 that stores simply the three discussed forms of biometric signatures (fingerprint, retina, and voice), there may be a 1-bit value for each of those biometric signatures that are valid for the given unique bio-identifier 400. E.g., Bit 0=fingerprint, Bit 1=retina, Bit 2=voice; so a value of 101 in the valid Biosig bit fields would mean that for this given stored unique bio-identifier 400, there are valid fingerprint and voice biometric signatures but no valid retina biometric signature.

Returning to FIG. 3, the bio-packet resolver server 304 receives the bio-packet 308 and determines if there is already a file on hand related to the user with the one or more unique biometric signatures in the packet header 310. To do this, the bio-packet resolver server 304 resolves a given unique biometric signature in the unique bio-identifier 400 and performs a lookup in its own table. To use one or more biometric signatures for comparison, there may be a bit-mask associated with a given biometric signature, which simply means the other biometric signature values in the unique bio-identifier are zeroed out when compared against an incoming specific biometric signature in the bio-packet 308. If there already is a valid file for the given user bio-identifier 400, then the data 312 in the bio-packet 308 is added to the current data available, which is stored in the bio-packet storage server 306. On the other hand, if a prior unique bio-identifier file does not exist for the particular user requesting the transfer, the received data is stored in a new empty file location in the bio-packet storage server 306. In many embodiments, the data from the packet is sent from the bio-packet resolver server 304 to the bio-packet storage server 306 once the bio-packet resolver server 304 either verifies that an entry currently exists for the received unique bio-identifier in header 310 or creates an entry for a new unique bio-identifier received from header 310 (communication route B in FIG. 3).

It is important to note that any given bio-identifier produced is tied to a file (e.g., an amount of data) to be transferred, it is not tied to a given device. Thus, in one example, a secondary user of the device may perform this type of biometric cloud transfer where the secondary user initiates and completes the transfer on an origination device and destination device the user has never before come in contact with.

Additionally, in some embodiments, the origination device and destination device may be the same device (e.g., for use in device backup situations).

According to some embodiments, the bio-packet resolver server 304 only maintains data temporarily and as soon as the destination device 302 receives the transferred data, the bio-packet resolver server 304 erases the entry for the user's unique bio-identifier 400 and the bio-packet storage server 306 erases the entry for the data associated with the user's unique bio-identifier. In other embodiments, the data and/or the unique bio-identifier 400 may be indefinitely saved for future usage as well as for ease of use for cross-compatibility of biometric signatures. Though, this is not necessary as the entire cloud data transfer process works fine without any cloud-based server or the destination device 302 requiring any previous knowledge of the origination device 300. In some embodiments, a limited number of cloud downloads per transferring file may be designated. This limited number may be set based on a usage policy/subscription by the cloud server(s) or set based on user preference.

In many embodiments, if the user decides to transfer two or more separate files (i.e., amounts of data) from one or more origination devices prior to pasting any amount of data to one or more destination devices, such as destination device 302, then the data may either be queued up in a given save order in the bio-packet storage server 306, the newer data may overwrite the older data, or the queue may be deemed full and the cloud bio copy will not work. For ease of use, generally the data will be queued, therefore, if there is already an amount of saved data received from a bio-packet being stored in the bio-packet storage server 306, a new data entry will be created so two amounts of data will be available at the unique bio-identifier value.

Figure 5:
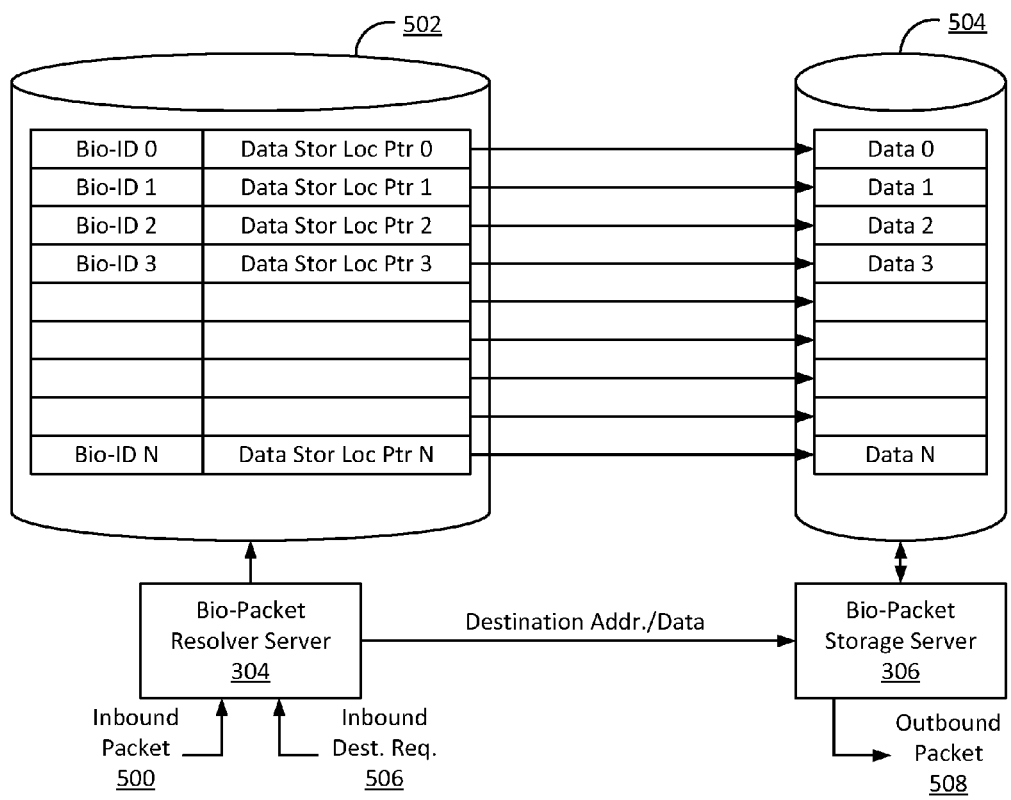
FIG. 5 illustrates an embodiment of the detailed storage available in a bio-packet resolver server and a bio-packet storage server.

FIG. 5 illustrates an embodiment of the detailed storage available in a bio-packet resolver server and a bio-packet storage server.

As discussed above, the bio-packet resolver server 304 receives an inbound packet 500 to temporarily store a unique bio-identifier and the associated data. First, the bio-packet resolver server 304 resolves the unique bio-identifier as the lookup address in a table stored in resolver server storage 502. The stored table comprises a column of unique bio-identifiers and a column of data storage location pointers. In many embodiments, different biometric signature elements may be indexed within the unique bio-identifier values to allow for different searches in the table for fingerprint, retina, voice, etc. biometric signatures being stored. The data from the incoming packet 500 is then sent from the bio-packet resolver server 304 to the bio-packet storage server 306 and stored in a database 504 in the storage server 306. The data storage location pointers in the table in resolver server storage 502 point to the locations in the database 504 in the storage server 306 that contain the data associated with each given unique bio-identifier.

If there are two or more amounts of data for a single unique bio-identifier, the database may have a linked list of amounts of data starting with the first amount of data at the location pointed to by the aforementioned data storage location pointer in the table in resolver server storage 502. Then for each additional amount of data, the previous amount of data may include a pointer to the next amount of data, until the last amount of data associated with the single unique bio-identifier is reached. In these embodiments, the last amount of data may have a NULL pointer to the next amount of data associated with the unique bio-identifier signifying that it is the last amount of data in the list. In other embodiments, the database 504 may have another standard way of storing multiple amounts of data for a single given unique bio-identifier.

Returning to FIG. 3, once the unique bio-identifier is stored in bio-packet resolver server 304 and the data is stored in bio-packet storage server 306 storage, then these cloud servers simply wait for a paste request for the data from a destination device, such as device 302.

Therefore, after a period of time, in many embodiments, the user then performs a request for receiving the data at the destination device (communication route C in FIG. 3). This is shown in FIG. 5 as well with bio-packet resolver server 304 receiving inbound destination request 506. The destination device may utilize one or more ways in which to perform a paste from the cloud, or more specifically, a cloud bio paste, which is initiated by the destination device sending this request for the data to the bio-packet resolver server 304. In many embodiments, the cloud bio paste would utilize the same high level address for a given biometric packet that is sent out to the cloud and routed to the centralized bio-packet resolver server 304 or group of interconnected centralized bio-packet resolver servers. In other words, when a paste request bio-packet is generated by any device attached to the cloud, the packet is sent up to the cloud with a first order address that initially routes any bio-packet-related request packet to the bio-packet resolver server 304 or servers.

Figure 6:
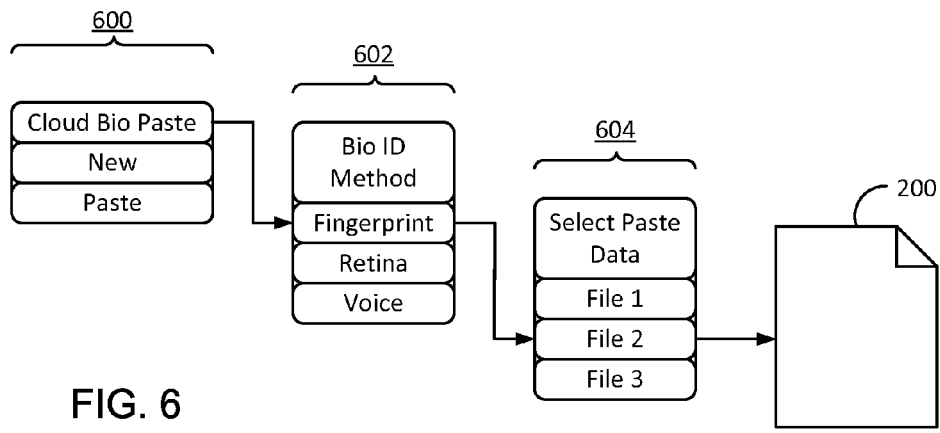
FIG. 6 illustrates an embodiment of menu selections for the cloud paste of a file on a smartphone.

FIG. 6 illustrates an embodiment of menu selections for the cloud paste of a file on a smartphone. In FIG. 6, the user (now located at the destination device/smartphone) initiates a paste. For a smartphone in particular, in many embodiments, the user may hold his/her finger down on an empty spot on the workspace/desktop of the smartphone where apps/files/etc. may be pasted. When the user's finger has been in contact with the surface of the touch screen for a period of time, the phone may prompt the user with a menu 600 to ask if he/she wants to Cloud Bio Paste, create a New file, or Paste, among other possible options (though in this embodiment these three options are shown for simplicity). The user then selects Cloud Bio Paste and a second menu 602 may appear. Because the user selected to Cloud Bio Paste, the destination device (in this instance a smartphone) requests to determine what biometric signature method would the user like to utilize to verify the user's identity. The user may select any form of biometric signature that the user had previously set up on the initial bio-packet transfer from the origination device. For example, if the user utilized a fingerprint biometric signature, the user now can select "fingerprint" and the destination device can then scan the user's fingerprint and upload the unique bio-identifier with the biometric fingerprint signature portion of the unique bio-identifier filled out into a request packet. This newly created unique bio-identifier on the destination device is then sent in the request packet to the bio-packet resolver server 304 (i.e. inbound destination request 506 in FIG. 5).

Returning now to FIG. 3, the bio-packet resolver server, after receiving the paste request from the destination device 302, performs a lookup of the paste request's unique bio-identifier. The bio-packet resolver server 304 may perform a lookup of all biometric signatures, but more efficiently will perform a lookup in the fingerprint portion of the unique bio-identifiers stored in the resolver server storage (502 in FIG. 5). Once found, the bio-packet resolver server 304 has already automatically verified the authenticity of the user requesting the data from the destination device 302 since the lookup is based on finding a matching fingerprint, so to speak. Thus, the user is verified as authentic and is allowed to receive an amount of data requested that is associated with the unique bio-identifier.

As discussed above, in the case where there are multiple amounts of data stored and associated with a single unique bio-identifier, the bio-packet storage server will perform an extra step of sending a request to specify which data to send to the user at the destination device 302. This element is shown in FIG. 6 as menu 604. Thus, the user can then select which data to paste associated with his/her fingerprint and send the paste request specificity result back to the bio-packet resolver server 304 and/or bio-packet storage server 306. The amount of data (e.g., file) is then sent from the bio-packet storage server 306 to the destination device 302 and pasted to the screen, which may be graphically shown as the file icon 200 (in FIG. 2 and FIG. 6) that now shows up on the destination device. This last transfer is shown as communication route D in FIG. 3 and as outbound packet 508 in FIG. 5. And the data movement utilizing biometric cloud communication is complete.

Figure 7:
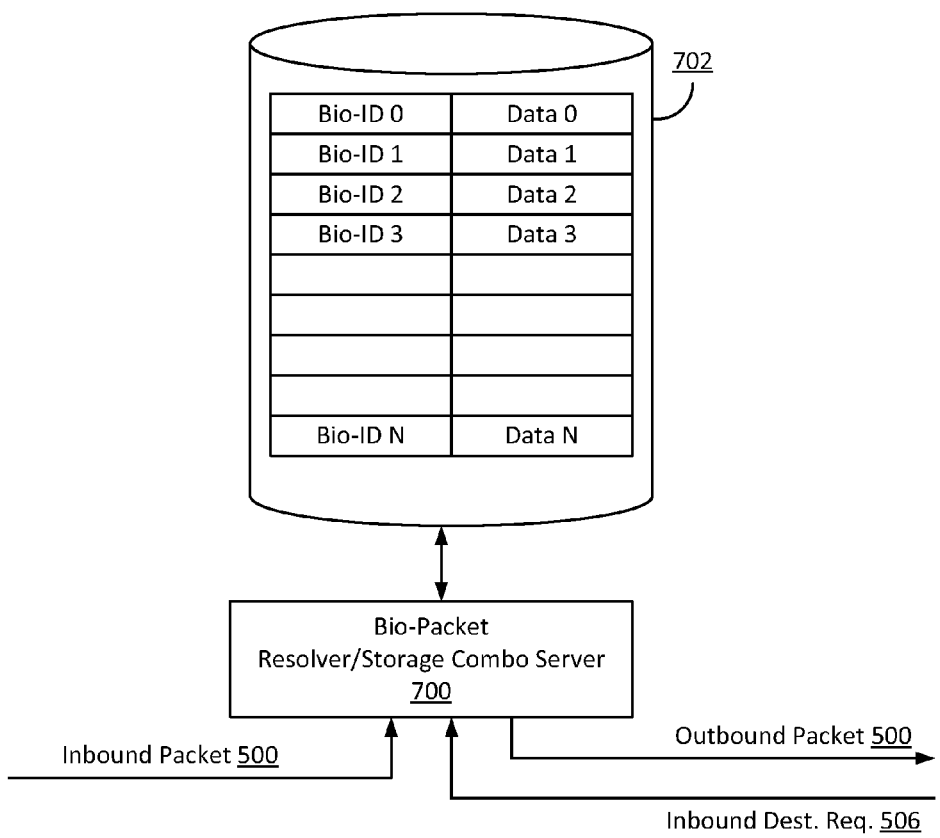
FIG. 7 illustrates an embodiment of the detailed storage available in a combination bio-packet resolver and storage server.

FIG. 7 illustrates an embodiment of the detailed storage available in a combination bio-packet resolver and storage server.

Another way in which to implement the cloud servers utilized to perform the described biometric cloud communications is to combine the bio-packet resolver server and the bio-packet storage servers, shown separately in FIG. 5, as a single server in FIG. 7. This server works similarly to the server described in FIG. 5 and simply reduces the server overhead. Therefore a bio-packet resolver/storage combo server 700 handles all communications with the origination and the destination devices and has a combined database 702 that has both the list of unique bio-identifiers and their associated amounts of data.

Figure 8:
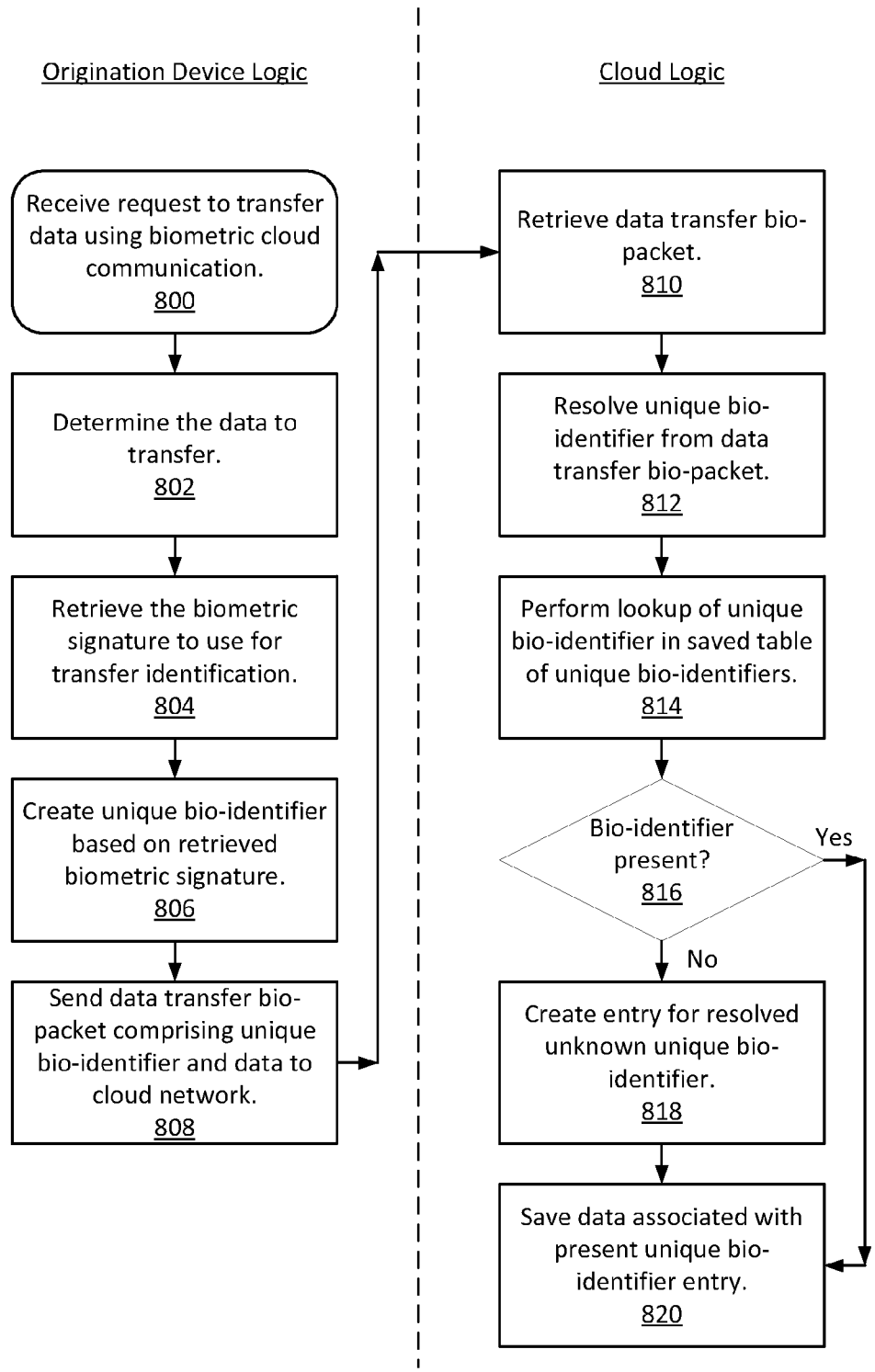
FIG. 8 is a flow diagram of an embodiment of a first portion of a process to transfer data from a first device to a second device through the use of biometric cloud communication.

FIG. 8 is a flow diagram of an embodiment of a first portion of a process to transfer data from a first device to a second device through the use of biometric cloud communication. The process may be performed by processing logic that in different embodiments may include hardware logic, software logic, firmware logic, or a combination of two or more of the listed types of processing logic. Additionally, in FIG. 8, the location of the processing logic is shown as either in an origination device or in the cloud. If the logic is in the origination device, the process steps performed are to the left of the dotted line that splits the figure in half (i.e. origination device logic). If the logic is in the cloud network (such as in the bio-packet resolver server and/or the bio-packet storage server), then the process steps performed are to the right of the dotted line that splits the figure in half (i.e. cloud logic).

Turning now to FIG. 8, the process begins by origination device processing logic receiving a request to transfer data using biometric cloud communication (processing block 800). This request is generally received from a user of the origination device.

Next, origination device processing logic determines the data to transfer (processing block 802). This determination may be based on information retrieved from the user, such as the user selecting a file to transfer with an input device that is utilized for the origination device (e.g., a touch screen, a mouse, a keyboard, etc.).

Then, origination device processing logic retrieves the biometric signature to use for transfer identification (processing block 804). This processing step includes potentially prompting the user to scan in a biometric signature.

Next, origination device processing logic creates a unique bio-identifier based on the retrieved biometric signature (processing block 806). As discussed above, the unique biometric signature may be converted into some form of numerical value. In some embodiments, additional origination device processing logic may encrypt this numerical value to not allow a malicious entity to see the numerical value representation of the biometric signature.

Then, origination device processing logic sends a data transfer bio-packet, comprising at least of a header containing the created unique bio-identifier and a packet body containing the data to be sent, to the cloud network (processing block 808).

Next, cloud processing logic retrieves the data transfer bio-packet sent from the origination device (processing block 810).

Then, cloud processing logic resolves the unique bio-identifier present in the header of the received data transfer bio-packet (processing block 812). In the embodiments that include the origination device having encryption logic to encrypt at least the unique bio-identifier, additional processing logic in the cloud has decryption logic to decrypt the unique bio-identifier from the bio-packet so it is useful.

Next, cloud processing logic takes the resolved unique bio-identifier and performs a lookup with it in a saved cloud table of unique bio-identifiers to see if the received unique bio-identifier is present in the table (processing block 814).

Then, cloud processing logic determines, based on the lookup, whether the unique bio-identifier is already present in the table (processing block 816).

If the unique bio-identifier is not present, then cloud processing logic creates an entry in the table for the resolved unknown unique bio-identifier (processing block 818).

Then, cloud processing logic saves the data associated with the newly present unique bio-identifier entry into a database (processing block 820).

Returning to block 816, if the bio-identifier is present, then cloud processing logic saves the data associated with the already present unique bio-identifier entry into the database (processing block 820).

Thus, FIG. 8 includes processing steps that start with a new data transfer request and end with the data associated with the biometric signature being saved into the cloud network.

Figure 9:
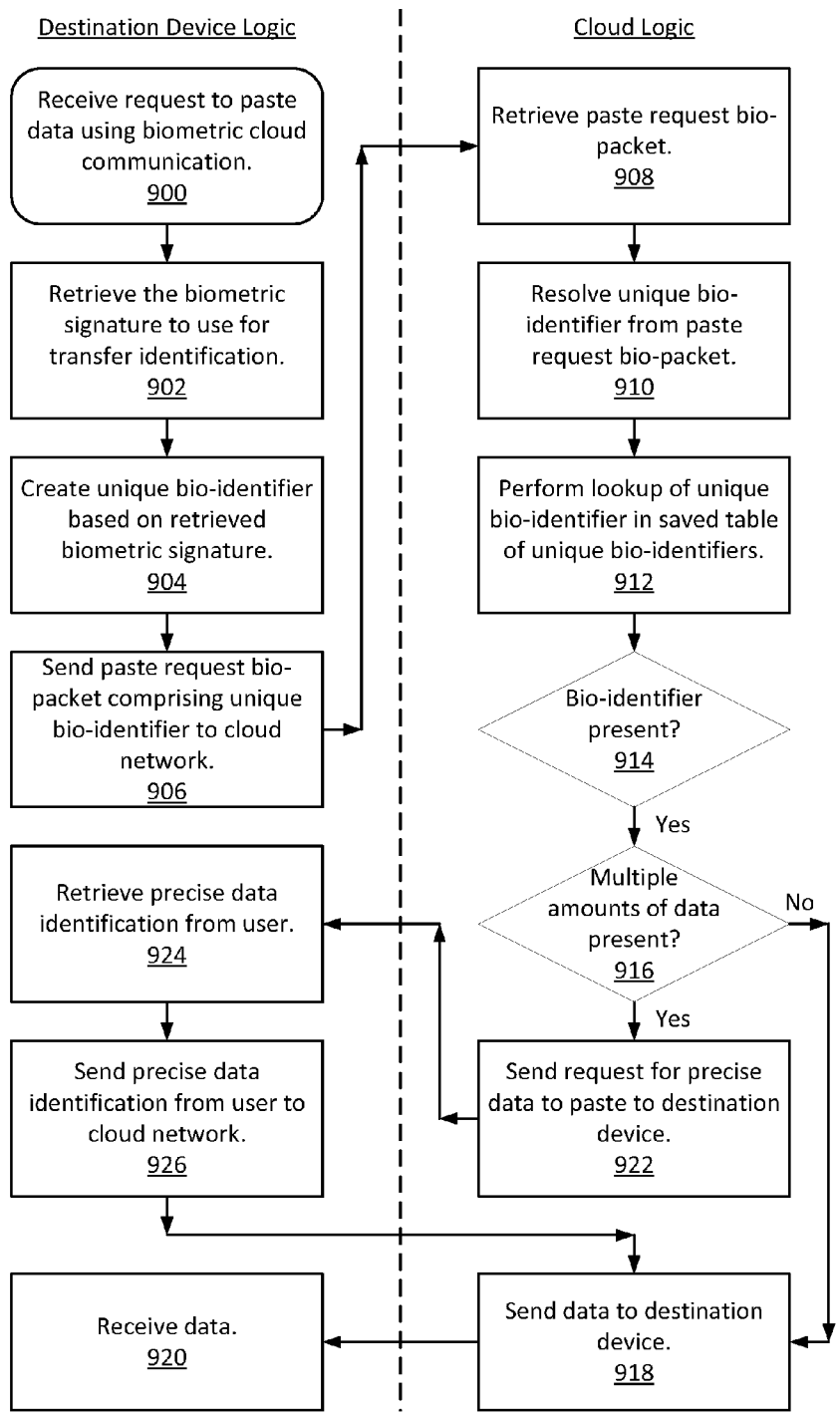
FIG. 9 is a flow diagram of an embodiment of a second portion of a process to transfer data from a first device to a second device through the use of biometric cloud communication.

Turning now to FIG. 9, this figure is a flow diagram of an embodiment of a second portion of a process to transfer data from a first device to a second device through the use of biometric cloud communication. The process may be performed by processing logic that in different embodiments may include hardware logic, software logic, firmware logic, or a combination of two or more of the listed types of processing logic. Additionally, in FIG. 9, the location of the processing logic is shown as either in a destination device or in the cloud. If the logic is in the destination device, the process steps performed are to the left of the dotted line that splits the figure in half (i.e. destination device logic). If the logic is in the cloud network (such as in the bio-packet resolver server and/or the bio-packet storage server), then the process steps performed are to the right of the dotted line that splits the figure in half (i.e. cloud logic).

In FIG. 9, the process begins by destination device processing logic receiving a request to paste data using biometric cloud communication (processing block 900). This request is generally received from a user of the destination device.

Then, destination device processing logic retrieves the biometric signature to use for transfer identification (processing block 902). This processing step includes potentially prompting the user to scan in a biometric signature.

Next, destination device processing logic creates a unique bio-identifier based on the retrieved biometric signature (processing block 904). As discussed above, the unique biometric signature may be converted into some form of numerical value. In some embodiments, additional destination device processing logic may encrypt this numerical value to not allow a malicious entity to see the numerical value representation of the biometric signature.

Then, destination device processing logic sends a paste request bio-packet, comprising at least of a header containing the created unique bio-identifier to the cloud network (processing block 906).

Next, cloud processing logic retrieves the paste request bio-packet sent from the origination device (processing block 908).

Then, cloud processing logic resolves the unique bio-identifier present in the header of the received data transfer bio-packet (processing block 910). In the embodiments that include the destination device having encryption logic to encrypt at least the unique bio-identifier, additional processing logic in the cloud has decryption logic to decrypt the unique bio-identifier from the bio-packet so it is useful.

Next, cloud processing logic takes the resolved unique bio-identifier and performs a lookup with it in a saved cloud table of unique bio-identifiers to see if the received unique bio-identifier is present in the table (processing block 912).

Then, cloud processing logic determines, based on the lookup, whether the unique bio-identifier is already present in the table (processing block 914).

If the bio-identifier is not present, the process ends since there is no data to retrieve. Otherwise, if the bio-identifier is present then cloud processing logic determines, whether there are multiple amounts of data associated with the found unique bio-identifier (processing block 916).

If there is only one amount of data (i.e., one file), then there are not multiple amounts of associated data and cloud processing logic sends the amount of data associated with the unique bio-identifier to the destination device (processing block 918).

Then, destination device processing logic receives the data (processing block 920) and the data transfer between two devices using biometric cloud communication is complete.

Returning to block 916, if there are multiple amounts of data present that are related to a single unique bio-identifier, then destination device processing logic sends a request for the precise data needed to the destination device (processing block 922). In many embodiments, this request includes summaries of the different amounts of data that are available to retrieve (e.g., file titles, thumbnail images, etc.).

Then, destination device processing logic takes the request and forwards it to the user initiating the paste request (e.g., in a graphical display, such as menu 604 in FIG. 6) and retrieves the precise data requested from the user (processing block 924).

Next, destination device processing logic takes the precise data information from the user and sends it to the cloud network (processing block 926).

Then, cloud processing logic sends the precise data to the destination device once it has retrieved the precise data information and can specify the data requested (processing block 918).

Finally, destination device processing logic receives the data (processing block 920) and the data transfer between two devices using biometric cloud communication is complete.

Figure 10:
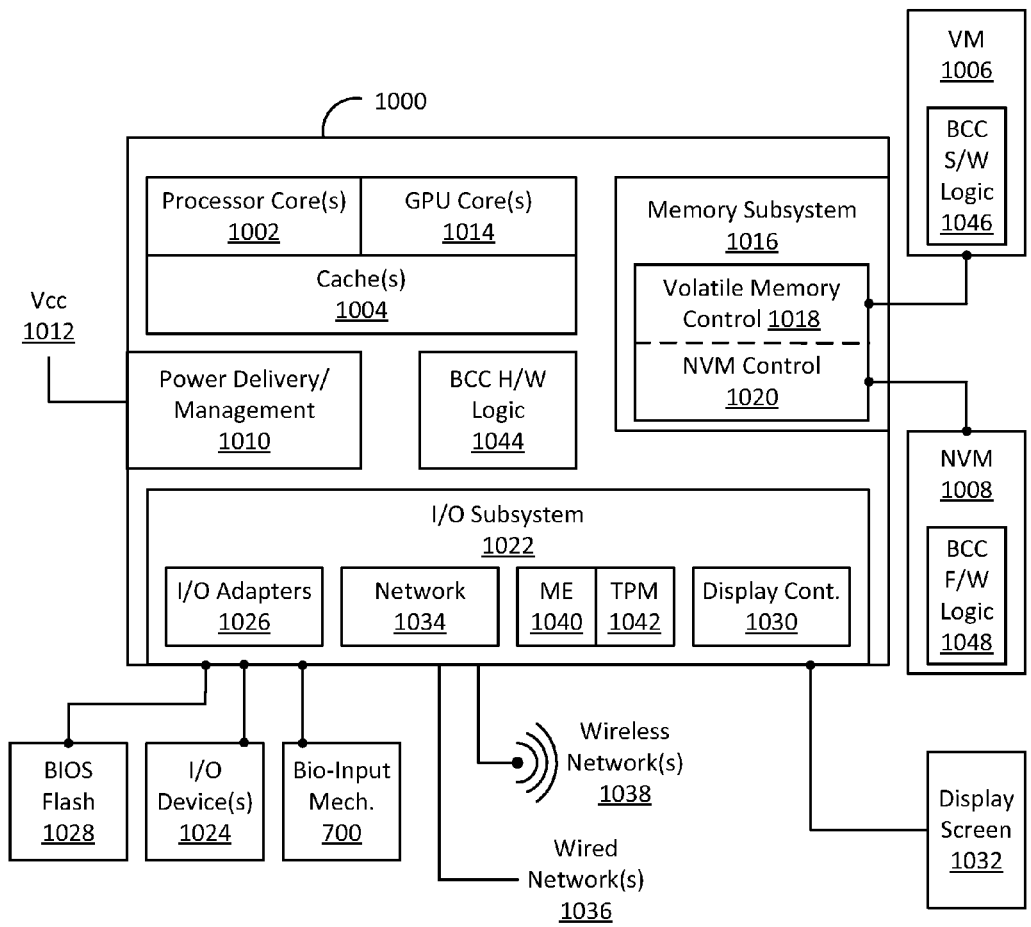
FIG. 10 illustrates an embodiment of a system arrangement that is capable of housing elements of the biometric cloud communication data transfer system such as a data transfer origination device, a data transfer destination device, and/or one or more cloud servers.

FIG. 10 illustrates an embodiment of a system arrangement that is capable of housing elements of the biometric cloud communication data transfer system such as a data transfer origination device, a data transfer destination device, and/or one or more cloud servers.

FIG. 10 shows a number of logic units which may or may not be located on the same or different semiconductor dies or the same or different semiconductor package. Logic units in FIG. 1 may include a processor (i.e., CPU) that has one or more cores and a cache, a GPU that also has one or more cores and a cache, a memory subsystem, and an L/O subsystem. These units are separated by dotted lines to show the possibility that each of these logic blocks may or may not be located in the same semiconductor die and/or package.

Turning now to the detailed elements of FIG. 10, in some embodiments there is a processor package containing all elements in system 1000. This generally may be referred to a system-on-a-chip (SoC) usage model and can be found in many smartphones, tablets, set-top boxes, embedded processors, laptops, and elsewhere. In other embodiments, there is a motherboard that may be represented by system 1000. In the motherboard embodiments, many of the logic units shown in FIG. 10 that are in system 1000 are discrete units that are separately coupled electrically to each other through routing lines on the motherboard. These embodiments may also be in laptops and also desktops, workstations, servers, among other computer systems.

In both embodiments, at least one processor is present and there are one or more cores 1002 in the processor(s). Although not shown, each core may internally include one or more instruction/data caches, execution units, prefetch buffers, instruction queues, branch address calculation units, instruction decoders, floating point units, retirement units, etc. In other embodiments that are not shown, the system may include multiple processors, each with its own set of logic units that are displayed in FIG. 10.

Additionally, the system 1000 includes at least one lower level cache, such as cache 1004. This may be a general purpose cache that is capable of storing a significant amount of data retrieved from memory locations in volatile memory (VM) 1006 and/or a non-volatile memory (NVM) 1008. In different embodiments, cache 104 may be shared among all cores or each core may have its own lower level cache.

System 1000 may also include additional power delivery and management logic 1010 which coordinates and operates at least core(s) 1002. The power delivery and management logic, for example, may include a power control unit (PCU). The PCU may include logic and components needed for regulating the power state of the core(s) 1002 among other tasks by regulating the incoming power (Vcc 1012) to the system 1000.

According to several embodiments, the computer system in FIG. 10 additionally includes a GPU. The GPU includes one or more GPU core(s) 1014. Each GPU core may include one or more execution units and one or more instruction and data caches utilized to feed the execution units with information to process. Additionally the GPU may contain other graphics logic units that are not shown in FIG. 10, such as one or more vertex processing units, rasterization units, media processing units, and codecs among others. For sake of simplicity, the specific logic within the GPU core(s) 1014 as well as other graphics-related logic units within the GPU are not shown.

There may be one or more lower level caches accessible by the GPU as well, such as shared cache 1004. This cache may be utilized as a general purpose cache for the GPU or a cache specific to one or more particular types of graphics data (e.g., vertex data). Other lower level caches are not shown, though in some embodiments multiple caches like cache 1004 exist within the GPU.

A memory subsystem 1016 is also present in FIG. 10. There may be a volatile memory controller 1018, which may be utilized to provide access to volatile memory 1006. Volatile memory controller 1018, which is integrated into the CPU package or discrete from the CPU package in different embodiments, may receive a memory access request from a CPU core 1002 or a GPU core 1014 and route that request to volatile memory 1006. Likewise, a NVM controller 1020 may receive a memory access request from a processor core 1002 or a GPU core 1024 and route that request to NVM 1008. In some embodiments, the volatile memory controller 1018 and non-volatile memory controller 1020 are integrated into one large memory controller. In other embodiments they are separate controllers.

In many embodiments, an input/output (I/O) subsystem 1022 is present in the system in FIG. 10 to communicate with I/O devices, such as I/O device(s) 1024. Within the I/O subsystem 1022, one or more I/O adapter(s) 1026 are present to translate a host communication protocol utilized within the processor core(s) 1002 to a protocol compatible with particular I/O devices. Some of the protocols that adapters may be utilized for translation include Peripheral Component Interconnect (PCI)-Express (PCI-E), 3.0; Universal Serial Bus (USB), 3.0; Serial Advanced Technology Attachment (SATA), 3.0; Small Computer System Interface (SCSI), Ultra-640; and Institute of Electrical and Electronics Engineers (IEEE) 1394 "Firewire;" among others.

A Basic Input/Output System (BIOS) flash 1028 device may additionally be present in the system to provide a set of boot instructions when the system powers on or reboots. For BIOS flash 1028 device, some of the protocols that I/O adapters 1026 may translate include Serial Peripheral Interface (SPI) and Microwire among others.

According to many embodiments, a display controller 1030 is communicatively coupled to the GPU core(s) 1014. The display controller 1030 receives information to be displayed upon a display screen 1032 (e.g., a monitor, a television, a projector, etc.). In many embodiments, the display controller 1030 specifically receives frame buffers. Each frame buffer consists of an image comprising pixels that is then interpreted by the display controller and the image is fed to the display device for viewing. Depending on the refresh frequency of the display screen 1032, frame buffers may be fed to the display controller 1030 a certain number of times per second. For example, a 60 Hz refresh rate utilizes 60 images (frame buffers of image information) per second. Different display devices may utilize higher frequency refresh rates and simply re-sample the same frame buffer two or more times prior to utilizing a new frame buffer of information to display.

Additionally, there may be one or more wired and wireless protocol I/O network adapters, such as network adapter 1034, that allow system 1000 to be communicatively coupled to one or more wired networks 1036 and one or more wireless networks 1038. An example of a wired network protocol includes Ethernet protocol. Examples of wireless protocols that are used in personal area networks are IEEE 802.15 and Bluetooth, 4.0; wireless local area networks, such as IEEE 802.11-based wireless protocols; and cellular protocols.

In some embodiments, I/O subsystem 1022 also includes a Management Engine (ME) 1040, which is a microprocessor (equivalently, a micro-controller) that allows a system administrator to monitor, maintain, update, upgrade, and repair system 1000. In one embodiment, a system administrator can remotely configure system 1000 through ME 1040 via networks 1036 and/or 1038.

In some embodiments, system 1000 also includes a Trusted Platform Module (TPM) 1042 to control access to system persistent states, such as secure data, encryption keys, platform configuration information and the like.

As discussed above, biometric cloud communication (BCC) logic, discussed throughout this document, may be separately utilized as hardware logic 1044, software logic 1046, and/or firmware logic 1048, or in a combination of two or more of the above listed forms of logic.

Additionally, there may be one or more biometric signature input mechanisms 1050 coupled to the system 1000. A biometric signature input mechanism 1050 may be a component/device that is capable of scanning a biometric signature into the system. A retina reading device, a fingerprint scanning device, and a microphone, among other mechanisms are examples of biometric signature input mechanisms.

Figure 11:
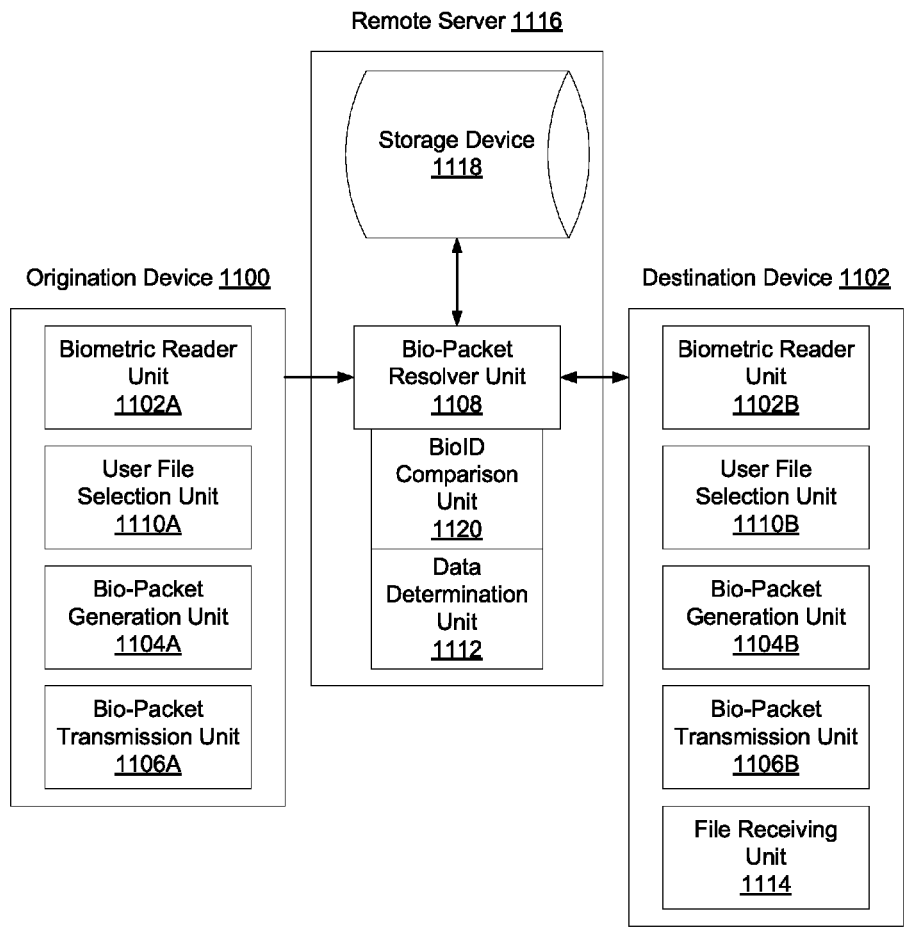
FIG. 11 illustrates an embodiment of a biometric cloud communication system for data transfer that includes unit-level logic for an origination device, a destination device, and one or more cloud network servers.

FIG. 11 illustrates an embodiment of a biometric cloud communication system for data transfer that includes unit-level logic for an origination device, a destination device, and one or more cloud network servers. As discussed below, FIG. 11 will relate many examples of biometric cloud communication systems.

These examples show that biometric reader unit 1102, user file selection unit 1110, bio-packet generation unit 1104, and bio-packet transmission unit 1106 may be included in both origination device 1100 and in destination device 1102. Thus, these units are shown as versions A and B separately in each of the devices.

Turning now to the examples, Example 1 includes subject matter that may include an apparatus, comprising a first computing device (e.g. an origination device 1100) having a processor coupled to memory (processor package 1000 with processor core(s) 1002 coupled to memory 1006 in FIG. 10), a first biometric reader unit 1102 to determine biometric signatures, the biometric reader unit communicatively coupled to the computing device, the memory to store a plurality of data files, and a bio-packet generation unit 1104 to generate a packet comprising a first bio-identifier, the first bio-identifier comprising at least one biometric signature of a user, and a biometric packet transmission unit 1106 to send the generated packet to a remote server 1116.

In example 2 the subject matter of example 1 optionally includes a user file selection unit to respond to a user request to select a first data file from the plurality of data files to include in the generated packet.

In example 3 the subject matter of example 2 optionally includes the bio-packet generation unit 1104 being further operable to additionally include in the packet the selected first data file.

In example 4 the subject matter of example 1 optionally includes a user file selection unit 1110 to respond to a request from a data determination unit 1112 at the remote server 1116, the data determination unit 1112 request comprising a request for a specific data file of a plurality of data files associated with an at least partially equivalent bio-identifier, stored at the remote server 1116, to the first bio-identifier, the response including an identification of the specific data file.

In example 5 the subject matter of example 4 optionally includes a file receiving unit 1114 to receive a first data file, the first data file being received in response to a request, sent to the remote server 1116, to receive the first data file.

In example 6 the subject matter of examples 1-5 optionally include one biometric signature comprising one of a fingerprint, a retina map, and a voice map.

In example 7 an apparatus 1116 may include a first computing device having a processor coupled to memory (processor package 1000 with processor core(s) 1002 coupled to memory 1006 in FIG. 10), at least one storage device 1118 to store a table of bio-identifiers and a list of data files (shown at least in 702 in FIG. 7), wherein each data file is associated with one bio-identifier, a bio-packet resolver unit 1108 to receive a first bio-packet from an origination computing device 1100, to resolve a first bio-identifier from the first bio-packet, the first bio-identifier comprising at least a first biometric signature, and to retrieve a first data file from the first bio-packet.

In example 8 the subject matter of example 7 optionally includes the bio-packet resolver unit 1108 being further able to perform a lookup of the first bio-identifier in the table of stored bio-identifiers, to store the first bio-identifier in the table of stored bio-identifiers when the lookup does not find the first bio-identifier already in the table of stored bio-identifiers, and to store the first data file in the storage device 1118.

In example 9 the subject matter of example 7 optionally includes a bio-identifier comparison unit 1120 to determine whether two given bio-identifiers are at least partially equivalent, wherein being at least partially equivalent comprises having one biometric signature in the two given bio-identifiers are equivalent.

In example 10 the subject matter of example 9 optionally includes the bio-packet resolver unit 1108 being further able to receive a second bio-packet from a destination computing device 1102, to resolve a second bio-identifier from the second bio-packet, the second bio-identifier comprising at least a second biometric signature, perform a lookup of the second bio-identifier in the table of stored bio-identifiers, and allow at least one data file to be transferred from the storage device 1118 to the destination computing device 1102 when the bio-identifier comparison unit 1120 determines that the second bio-identifier is at least partially equivalent to one of the bio-identifiers in the table of stored bio-identifiers.

In example 11 the subject matter of example 10 optionally includes a data determination unit 1112 that is able to, when more than one data file stored in the storage device 1118 is associated with the resolved second bio-identifier, send a request to the destination computing device 1102 for a specific data file of the more than one data files associated with the second bio-identifier.

In example 12 the subject matter of any of example 7-11 optionally include the at least one biometric signature being one of a fingerprint, a retina map, and a voice map.

In example 13 a method may include, responsive to a user selection at a first device to transfer data via a cloud network, determining a first bio-identifier for the user by obtaining at least one biometric signature from the user at the first device, wherein the at least one biometric signature from the user at the first device is associated with the first bio-identifier, generating a first packet, the packet at least including the first bio-identifier, and transferring the first packet from the first device to a remote server coupled to the cloud network.

In example 14 the subject matter of example 13 optionally includes responsive to a user file selection at the first device, determining a first data file from a plurality of data files stored in the first device to be included in the generated packet transferred to the remote server.

In example 15 the subject matter of example 14 optionally includes in the generated packet the determined first data file.

In example 16 the subject matter of example 13 optionally includes responding to a request from a data determination unit at a remote server, the data determination unit request comprising a request for a specific data file of a plurality of data files associated with an at least partially equivalent bio-identifier, stored at the remote server, to the first bio-identifier, the response including an identification of the specific data file.

In example 17 the subject matter of example 16 optionally includes receiving a first data file, the first data file being received in response to a request, sent to the remote server, to receive the first data file.

In example 18 the subject matter of any of examples 13-17 optionally includes the at least one biometric signature being one of a fingerprint, a retina map, and a voice map.

In example 19 a method or a computer accessible medium storing a method may include the method storing a table of bio-identifiers and a list of data files, wherein each data file is associated with one unique bio-identifier, receiving a first bio-packet from an origination computing device, resolving a first bio-identifier from the first bio-packet, the first bio-identifier comprising at least a first biometric signature, and retrieving a first data file from the first bio-packet.

In example 20 the subject matter of example 19 optionally includes performing a lookup of the first bio-identifier in the table of stored bio-identifiers, storing the first bio-identifier in the table of stored bio-identifiers when the lookup does not find the first bio-identifier already in the table of stored bio-identifiers, and storing the first data file in the storage device.

In example 21 the subject matter of example 19 optionally includes determining whether two given bio-identifiers are at least partially equivalent, wherein being at least partially equivalent comprises having one biometric signature in the two given bio-identifiers are equivalent.

In example 22 the subject matter of example 21 optionally includes receiving a second bio-packet from a destination computing device, resolving a second bio-identifier from the second bio-packet, the second bio-identifier comprising at least a second biometric signature, performing a lookup of the second bio-identifier in the table of stored bio-identifiers, and allowing at least one data file to be transferred from the storage device to the destination computing device when the bio-identifier comparison unit determines that the second bio-identifier is at least partially equivalent to one of the bio-identifiers in the table of stored bio-identifiers.

In example 23 the subject matter of example 22 optionally includes, when more than one data file stored in the storage device is associated with the resolved second bio-identifier, sending a request to the destination computing device for a specific data file of the more than one data files associated with the second bio-identifier.

In example 24 the subject matter of any of examples 19-23 optionally includes at least one biometric signature being one of a fingerprint, a retina map, and a voice map.

In example 25 the subject matter may be a system that includes a cloud network (100 in FIG. 1), a first computing device 1100, communicatively coupled to the cloud network, to receive a first request from a user to transfer an amount of data from the first computing device to a second computing device 1102 over the cloud network, determine a first unique bio-identifier for the user by obtaining at least one biometric signature from the user, wherein the at least one biometric signature from the user is associated with the unique bio-identifier, and transfer the amount of data from the first device to at least a first server 1116 communicatively coupled to the cloud network. The first server can receive the transferred amount of data, and at least temporarily store the received amount of data. The second computing device to receive a second request to receive the amount of data from the cloud network, determine a second unique bio-identifier for the user by obtaining the least one biometric signature from the user, wherein the at least one biometric signature from the user is associated with the unique bio-identifier, and sending the second unique bio-identifier to the first server. The first server also can determine that the second request originates from the user by verifying the first unique bio-identifier is substantially equal to the second unique bio-identifier, and transfer the stored amount of data to the second device when the user has been determined to have originated the second request.

In example 26 the subject matter of example 25 optionally includes the first server being further able to store a plurality of biometric signatures, the at least one biometric signature being one of the plurality of biometric signatures, wherein the unique bio-identifier is associated with the plurality of biometric signatures, and wherein the at least one biometric signature obtained from the first device and the at least one biometric signature obtained from the second device are different biometric signatures that are both associated with the unique bio-identifier.

In example 27 the subject matter of example 25 optionally includes the first computing device being able to transfer the amount of data within a bio-packet, the bio-packet comprising at least a data portion of the packet that includes the amount of data and a header portion of the packet that includes the unique bio-identifier for the user.

In example 28 the subject matter of example 25 optionally includes the first server being to store one or more additional amounts of data associated with the first unique bio-identifier.

In example 29 the subject matter of example 28 optionally includes the unique bio-identifier received from the first device being associated with a plurality of amounts of data, and the second request received from the second device specifies which of the amounts of data in the plurality is being requested to be transferred to the second device.

In example 30 the subject matter of example 25 optionally includes the first server being able to erase the amount of data associated with the bio-packet received from the first device after the amount of data has been subsequently transferred to the second device.

In example 31 the subject matter of example 25 optionally includes the first server being able to save the unique bio-identifier associated with the bio-packet received from the first device after the amount of data has been subsequently transferred to the second device.

In example 32 the subject matter of any of examples 25-31 optionally includes the at least one biometric signature being one of a fingerprint, a retina map, and a voice map.

In the description, numerous specific details such as logic implementations, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

I claim:

1. A destination apparatus, comprising:
a first computing device having at least a processor, memory, and a storage medium; and
a biometric reader unit including at least hardware to read biometric data to determine biometric signatures, including a first biometric signature of a first user;
wherein the first computing device to:
receive a request from the first user to paste at least a copy of a first file, the first file being remote from the apparatus, to the apparatus;
create a first bio-identifier based on the first biometric signature;
send a cloud bio paste request, including at least the first bio-identifier, to a remote server, wherein the first file is associated with the first bio-identifier; and
receive at least the copy of the first file from the remote server in response to the sent cloud bio paste request.

2. The destination apparatus of claim 1, wherein the first computing device further to:
receive a request from a remote server to identify a specific file from a group of multiple files associated with the first bio-identifier; and
send precise data identification information to the remote server identifying the specific file.

3. The destination apparatus of claim 1, further including a touch screen display, wherein an icon representing the first file to appear on the display at a location where the first user touches in response to the receiving at least the copy of the first file.

4. The destination apparatus of claim 1, wherein the received at least copy of the first file to be stored in the storage medium.

5. The destination apparatus of claim 1, wherein the cloud bio paste request sent to the remote server does not include any specific information related to the first file.

6. The destination apparatus of claim 1, wherein the cloud bio paste request sent to the remote server includes at least a name of the first file.

7. A origination apparatus, comprising:
a first computing device having at least a processor, memory, and a storage medium; and
a biometric reader unit including at least hardware to read biometric data to determine biometric signatures, including a first biometric signature of a first user;
wherein the first computing device to:
receive a request from the first user to perform a cloud bio copy of a first file to a remote server;
create a first bio-identifier based on the first biometric signature; and
send a cloud bio copy request including at least a copy of the first file and the first bio-identifier to the remote server.

8. The origination apparatus of claim 7, wherein a copy of the first file to be stored in the storage medium.

9. A system, comprising:
a group of processors;
one or more storage mediums to store at least
a table with a list of bio-identifiers and corresponding data storage location pointers, wherein each data file location pointer is associated with at least one unique bio-identifier, wherein each bio-identifier comprises at least one biometric signature, and
the set of data files corresponding to the list of data file location pointers listed in the table; and
a memory to store instructions, which when executed on at least one processor of the group of processors, cause the at least one processor to:
receive a cloud bio-copy request from a remote origination device, the cloud bio-copy request to include a first bio-packet that comprises at least a first data file and a corresponding first bio-identifier;
resolve the first bio-identifier; and
store the first data file in at least one of the one or more storage mediums.

10. The system of claim 9, wherein the instructions stored in the memory, when executed on the at least one processor of the group of processors, cause the at least one processor to:
look up the first bio-identifier in the table; and
add the first data file location pointer to the table corresponding to the first bio-identifier in response to the first bio-identifier already being listed in the table.

11. The system of claim 9, wherein the instructions stored in the memory, when executed on the at least one processor of the group of processors, cause the at least one processor to:
look up the first bio-identifier in the table; and
add the first bio-identifier in the table in response to not finding the first bio-identifier already in the table.

12. The system of claim 9, wherein the instructions stored in the memory, when executed on the at least one processor of the group of processors, cause the at least one processor to:
receive a cloud bio-paste request from a remote destination device, the cloud bio-paste request to at least include a second bio-packet that comprises at least a second bio-identifier;
resolve the second bio-identifier;
look up the second bio-identifier in the table; and
send a second data file to the remote destination device in response to the second bio-identifier being present in the table, wherein the second bio-identifier corresponds to a second data file location pointer.

13. The system of claim 12, wherein the instructions stored in the memory, when executed on the at least one processor of the group of processors, cause the at least one processor to:
send a request to the remote destination device to identify a specific file from a group of multiple files associated with the first bio-identifier in response to the first bio-identifier corresponding to multiple files in the table; and
receive the specific file identification from the remote destination device.

14. The system of claim 12, wherein the cloud bio paste request received from the remote destination device does not include any specific information related to the first file.

15. The system of claim 12, wherein the cloud bio paste request received from the remote destination device includes at least a name of the first file.

16. The system of claim 9, wherein one or more storage mediums to store a plurality of biometric signatures, the at least one biometric signature being one of the plurality of biometric signatures, wherein the unique bio-identifier is associated with the plurality of biometric signatures, and wherein the at least one biometric signature obtained from the origination device and the at least one biometric signature obtained from the destination device are different biometric signatures that are both associated with the unique bio-identifier.

* * * * *